United States Patent [19]

Terasawa et al.

[11] Patent Number: 4,893,138

[45] Date of Patent: Jan. 9, 1990

[54] INK JET RECOVERY DEVICE INCLUDING A COMMUNICATING VALVE AND A VENTILATING VALVE

[75] Inventors: Koji Terasawa, Mitaka; Hideki Yamaguchi, Yokohama; Akira Miyakawa, Tanashi; Shinya Matsui; Mikio Shiga, both of Yokohama; Shigeru Tsuyukubo, Kawasaki, all of Japan

[73] Assignee: Canon Kabushiki Kaisha, Tokyo, Japan

[21] Appl. No.: 166,527

[22] Filed: Mar. 10, 1988

[30] Foreign Application Priority Data

Mar. 13, 1987 [JP] Japan .................................. 62-58390
Mar. 8, 1988 [JP] Japan .................................. 63-54279

[51] Int. Cl.[4] .............................. G01D 15/6; B41J 3/04
[52] U.S. Cl. .................................................. 346/140 R
[58] Field of Search .......................................... 346/140

[56] References Cited

U.S. PATENT DOCUMENTS 4,394,669 7/1983 Ozawa .................................. 346/140
4,600,931 7/1986 Terasawa ........................ 346/140 R
4,631,556 12/1986 Watanabe et al. .............. 346/140 R
4,739,847 4/1988 Terasawa ............................ 177/140

FOREIGN PATENT DOCUMENTS 3128366 7/1982 Fed. Rep. of Germany .
3611333 10/1986 Fed. Rep. of Germany .
1134464 9/1981 Japan .
229562 10/1986 Japan .
2184066 6/1987 United Kingdom .

*Primary Examiner*—Joseph W. Hartary
*Attorney, Agent, or Firm*—Fitzpatrick, Cella, Harper & Scinto

[57] ABSTRACT

A recovery device for an ink jet recording apparatus having a cup for an ink discharge port of a recording head and a suction device communicating with the cap for sucking ink from the ink discharge port includes a communicating tube, a communicating valve, and a ventilating valve. The communication tube communicates with the cap and a subtank which supplies ink to the recording head. A communicating valve connects and disconnects communication of the cap with the subtank and is provided in an intermediate portion of the tube. A ventilating valve communicates the interior of the tube with the atmosphere and is provided separately from the communicating valve.

49 Claims, 14 Drawing Sheets

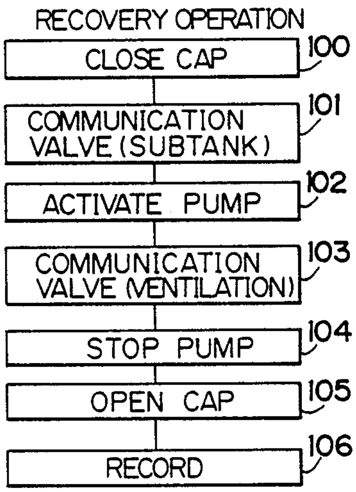
Fig.5A
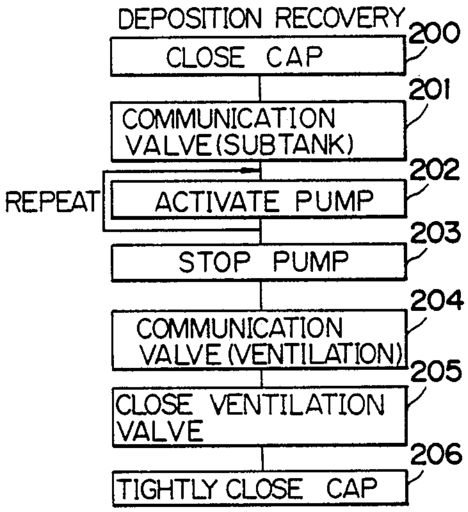
Fig.5B
Fig. 6
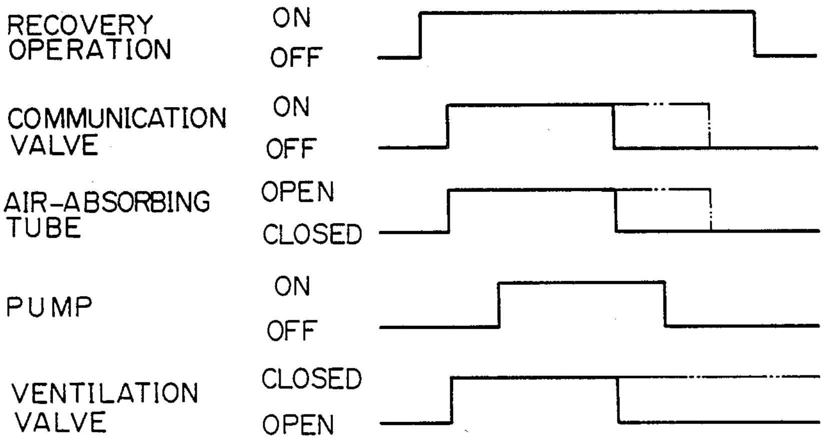

INK JET RECOVERY DEVICE INCLUDING A COMMUNICATING VALVE AND A VENTILATING VALVE

BACKGROUND OF THE INVENTION

1. Field of the Invention

The present invention relates to a recovery device for an ink-jet recording apparatus for injecting ink to perform recording and an ink-jet recording apparatus having the recovery device.

2. Related Background Art

A conventional ink-jet recording apparatus supplies ink to a recording head, drives driving elements corresponding to a plurality of ink injection ports formed in an ink discharge surface of the recording head on the basis of a data signal, forms ink droplets to be injected from the ink injection ports to a recording medium, and deposits the ink droplets onto the recording medium, thereby recording information on the recording medium.

A conventional ink-jet recording apparatus of this type employs a recovery device. In general, in order to maintain a good ink injection state, an ink supply path is filled with ink even when the recording apparatus housing is opened, an ink tank is replenished or a recording head is replaced with a new one. The recovery device is activated to prevent an ink injection port from clogging caused by dust or increasing viscosity of the ink or deposition of ink around the discharge ports or air mixing in the ink supply path and hence to obtain a high quality image. According to the conventional recovery device, the ink injection ports are closed by a cap, the cap is connected to suction means such as a suction pump, and the suction means is activated to draw the ink in the recording head through the ink injection ports so that clogging is prevented to return to a desired discharge state.

In general, a sub-ink tank (subtank) is arranged adjacent to the recording head. After the ink is temporarily stored from a main ink tank (main tank) to the subtank, the ink is supplied to a recording head (e.g., a common chamber of the ink injection ports).

In the subtank, an ink level must be maintained within a predetermined range (e.g., a relatively high level) in order to stably supply the ink to the recording head. For this reason, the subtank must be evacuated by the suction means.

An openable ventilation means is connected to the cap. The ventilation means is closed during an operation with suction force effected by negative pressure and generated in the ink supply path, e.g., during an ink recovery operation as well as during transportation. During normal capping, the ventilation means is open to communicate with an atmospheric pressure, thereby preventing air from entering the nozzles.

In the conventional ink-jet recording apparatus, the air-absorbing tube from the subtank is directly connected to the suction means, and an abosrbing tube from the cap is also directly connected to the pump. When ink clogging is caused by deposition and an increase in viscosity of the ink at the ink injection ports (i.e., nozzles), the ink can be no longer drawn from the ink injection ports. Therefore, it is often very difficult or impossible to perform the recovery operation.

An orifice diameter of each ink injection port tends to be decreased as the number of dots is increased so as to obtain a clear image. Lack of recovery in such ink injection ports poses a crucial problem.

SUMMARY OF THE INVENTION

It is an object of the present invention to provide a very compact recovery device for an ink-jet recording apparatus and an ink jet recording apparatus having the recovery device, which solves the conventional problem described above and which effectively performs an ink recovery operation in different modes corresponding to degrees of clogging even if the ink injection ports clog due to ink deposition or an increase in ink viscosity.

It is another object of the present invention to provide a very compact recovery device for an ink-jet recording apparatus and an ink jet recording apparatus having the recovery device, wherein different types of recovery operations can be performed.

In order to achieve the above objects of the present invention, an air-absorbing tube is arranged between an ink subtank and a cap for sealing the ink injection ports to draw air from the subtank, and a valve is arranged midway along the air-absorbing tube.

In order to achieve the above objects of the present invention, an abosrbing tube is arranged to cause the ink subtank to communicate with the cap, and a communication valve for opening/closing between the absorbing tube and the subtank and a ventilation valve for causing the absorbing tube to communicate with atmospheric air are arranged in the intermediate portion along the absorbing tube.

As stated above, the communication function and the ventilation function are performed respectively by separate valves, so that an amount of ink filled in the cap can be variably controlled as required and various recovery operations can be performed.

For example, when ink is strongly deposited in the ink injection port, the ink is kept filled in the cap for one or more minutes, and the pump is activated several times to continuously supply fresh ink into the cap, thereby performing deposition recovery.

BRIEF DESCRIPTION OF THE DRAWINGS

FIGS. 4A and 4B are respectively longitudinal sectional views showing different operation states of a communication valve of the recovery device according to a first embodiment shown in FIG. 1, in which FIG. 4A shows a position where the communication valve is closed and FIG. 4B shows a position where the valve communicates with a subtank;

FIGS. 5A and 5B are flow charts for explaining operations of the recovery device shown in FIG. 1, in which FIG. 5A shows ordinary recovery operation and FIG. 5B shows deposition recovery operation;

FIG. 6 is a timing chart showing the recovery operations;

FIGS. 8A and 8B are respectively longitudinal sectional views showing different operating states of a communication valve shown in FIG. 7, in which FIG. 8A shows a position where the valve is closed, and FIG. 8B shows a position where the valve communicates with a subtank;

DETAILED DESCRIPTION OF THE PREFERRED EMBODIMENTS

The present invention will be described in detail with reference to the accompanying drawings.

Figure 1:
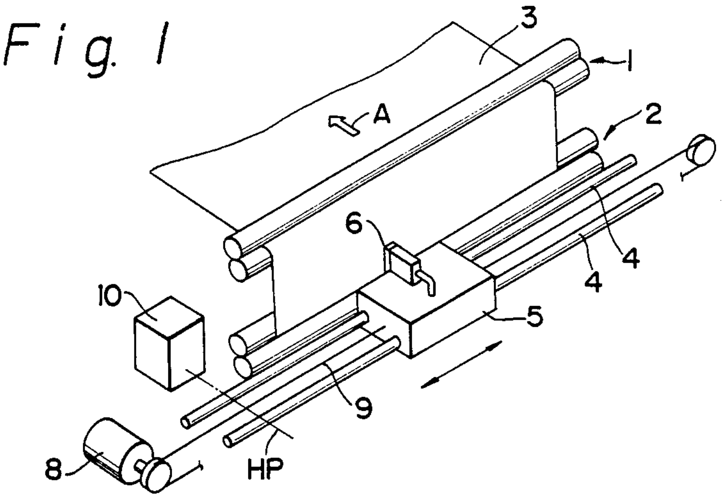
FIG. 1 is a perspective view of an ink-jet recording apparatus which suitably employs the present invention.

FIG. 1 shows an outline of an ink-jet recording apparatus which suitably employs the present invention.

Referring to FIG. 1, a carriage 5 movable along guide shafts 4 is arranged on the front surface of a sheet (recording medium) 3 fed by sheet feed rollers 1 and 2 along a direction indicated by arrow A. The sheet feed rollers 1 and 2 are vertically spaced apart from each other by a predetermined gap. A recording head (i.e., an ink-jet head) 6 is mounted on the carriage 5. The recording head 6 is spaced from the sheet by a gap of 0.8 mm. The recording head 6 discharges liquid droplets, for example, by heat through discharge ports which are highly minute.

A plurality of ink injection ports constituting dots are formed in the front surface on the recording head 6.

The carriage 5 can be reciprocally moved by a carriage drive motor 8 through a belt transmission mechanism 9 in directions indicated by the double-headed allow.

In order to perform recording, drive elements of the recording head 6 at the ink injection ports are selectively driven in synchronism with driving of the carriage 5 along the widthwise direction of the sheet 3, thereby forming ink droplets injected from the ink injection ports to the sheet 3.

When recording is completed, the recording head 6 is stopped at a home position HP outside the recording range. An ink recovery device 10 of a pump suction type is arranged at the home position HP.

(First Embodiment)

Figure 2:
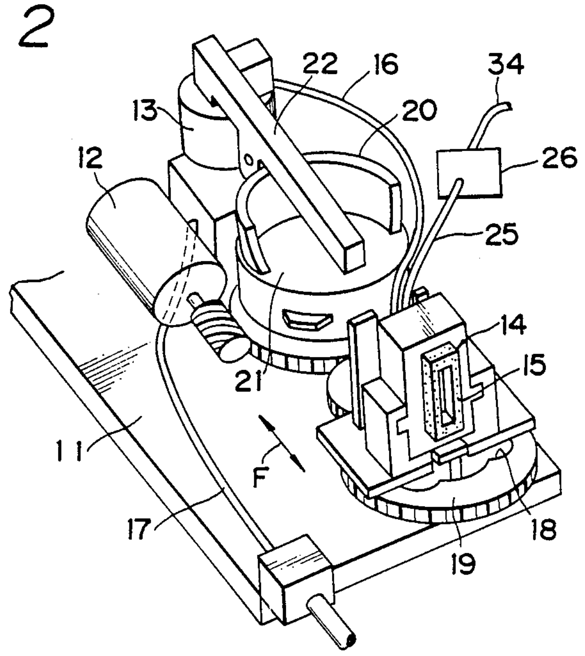
FIG. 2 is a perspective view of a recovery device suitable for the ink jet recording apparatus shown in FIG. 1.

FIG. 2 shows an ink recovery device 10 according to the first embodiment.

Referring to FIG. 2, a motor 12 as a driving source and an ink recovery absorbing pump 13 as suction means are mounted on a frame 11. A cap 14 for closing the ink injection ports of the recording head 6 is supported to be reciprocally guided in a direction indicated by the double-headed arrow F at the front portion (i.e., a recording head side).

A rubber-like elastic seal 15 is fitted around the sealed space of the cap 14. When the cap 14 is brought into contact with the recording head 6, air-tightness of the cap can be assured.

The internal space of the cap 14 is connected to an absorbing pump 13 through an absorbing tube 16. An ink drain tube 17 is connected to the delivery side of the absorbing pump 13 to drain the ink.

An ink-absorbing member made of a porous material for absorbing ink therein is partially filled in the cap 14 at the ink recovery side.

The internal space of the cap 14 is connected to an electromagnetic valve 26 as a communication valve through an air-absorbing tube 25. A ventilation valve 27 (FIG. 3) is arranged at the distal end of the communication valve 26. Therefore, when the communication valve 26 is set at a ventilation position (i.e., a position where the communication valve 26 communicates with the ventilation valve 27 while the ventilation valve 27 (FIG. 3) is kept open, the interior of the cap 14 communicates with the atmospheric air.

Referring to FIG. 2, a cap driving gear 19 having an inner surface cam 18 for driving the cap 14 back and forth (i.e., in directions indicated by double-headed arrow F) and a pump driving gear 21 having an end face cam 20 for driving the absorbing pump 13 are axially supported on the frame 11. The gears 19 and 21 are driven by the motor 12 through a gear train.

A lever 22 is axially supported between the pump driving gear 21 and the absorbing pump 13. The lever 22 can be swung by a change in lift of the end face cam 20 to drive the suction pump 13 upon rotation of the pump driving gear 21.

The entire ink recovery device 10 can be moved toward or away from the recording head 6.

Figure 3:
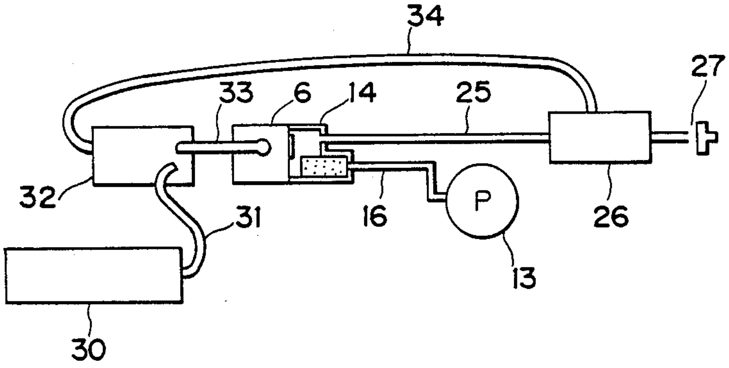
FIG. 3 is a schematic diagram of a recovery device for an ink-jet recording apparatus according to a first embodiment of the present invention.

FIG. 3 is a schematic diagram for explaining the recovery operation of the recovery device 10 according to the present invention.

Referring to FIG. 3, ink is temporarily supplied from a main tank 30 to a subtank 32 through an ink supply tube 31 and is then supplied from the subtank 32 to the recording head 6 (more specifically, a common ink chamber which communicates with each ink injection port) through an ink tube 33.

The subtank 32 is mounted at a carriage 5 position (FIG. 1) adjacent to the recording head 6.

The main tank 30 may be mounted on the carriage 5 or the base of the apparatus housing.

The subtank 32 is connected to the communication valve 26 through an air-absorbing tube 34.

The communication valve (electromagnetic valve) 26 is a two-way valve and is set between a communication position (FIG. 4A) wherein the air-absorbing tube 25 communicates with the ventilation valve 27 and a subtank communication position (FIG. 4B) wherein the air-absorbing tube 25 communicates with the air-absorbing tube 34.

Figure 4A:
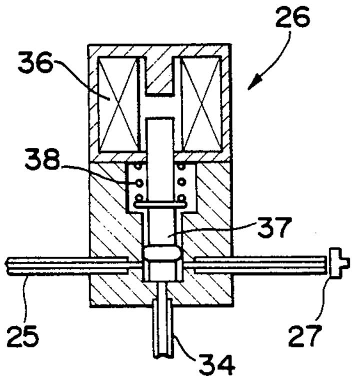
Figure 4B:
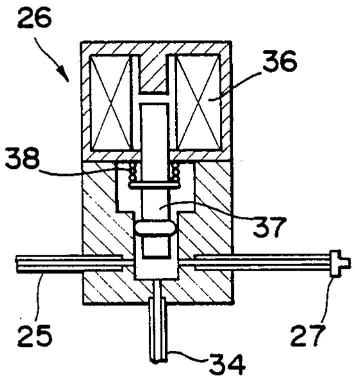

FIGS. 4A and 4B show operating states of the electromagnetic valve 26, in which FIG. 4A shows a position where the cap is held in the ventilation position and FIG. 4B shows a position where the valve communicates with the subtank.

The electromagnetic valve 26 comprises a solenoid 36 housed in a case 35 and a plunger 37 serving as a movable member and driven by the solenoid 36. When the solenoid 36 is deenergized, the plunger 37 is biased by a spring 38 to the ventilation position shown in FIG. 4A. When the solenoid 36 is energized, the plunger 37 is moved against the spring 38 to the subtank communication position shown in FIG. 4B. The distal end of the plunger 37 has a sealing structure made of an elastic member.

When the plunger 37 is in the ventilation position, the air-absorbing tube 34 does not communicate with the subtank, and the air-absorbing tube 25 communicates with the ventilation valve 27. In this state, the interior of the cap 14 can communicate with the atmospheric air if the ventilation valve 27 is open.

When the plunger 37 is in the subtank communication position, the opening of the path communicating with the ventilation valve 27 is closed, and the air-absorbing tube 25 communicates with the air-absorbing tube 34 which communicates with a space above the ink level in the subtank 32.

In the recovery device for the ink-jet recording apparatus, i.e., in the recovery device wherein the cap 14 for closing the ink injection ports of the recording head 6 is connected to the absorbing pump 13 to supply ink through the ink injection ports, the air-absorbing tubes 34 and 25 are disposed between the subtank 32 and the cap 14 to evacuate the subtank, and the electromagnetic valve 26 is disposed intermediate the air-absorbing tubes 34 and 25.

According to the structure of the first embodiment, in ordinary recovery, the ventilation valve 27 is closed. In this state, ink is supplied from the ink injection ports to the absorbing pump 13 through the cap 14 and the ink-absorbing tube 16. Therefore, air bubbles can be removed and meniscus recovery can be performed.

In deposition recovery wherein ink is deposited in the ink injection ports to cause clogging and disable ink absorption, the electromagnetic valve 26 is activated and set in the subtank communication position in FIG. 4B. In this state, a negative pressure force acts from the subtank 32 to the absorbing pump 13 through the air-absorbing tube 34, the electromagnetic valve 26, the air-absorbing tube 25, the cap 14, and the ink-absorbing tube 16. Since ink injection ports are clogged with ink, the ink in the subtank 32 is drawn together with air through the air-absorbing tubes 34 and 25 and is stored in the cap 14. Ink deposition clogging of the ink injection ports can be recovered such that the deposited ink is dampened and dissolved by the ink stored in the cap 14, thereby causing a smooth ink flow.

Even if ink injection port clogging caused by ink deposition occurs, the recovery operation can be effectively and properly performed.

In the above embodiment, since the electromagnetic valve 26 for cap communication is used to open/close the air-absorbing tubes 34 and 25 connected to the subtank 32, an additional valve need not be arranged, thus providing a compact recovery device.

FIGS. 5A and 5B are flow charts for explaining an operation sequence of the recovery device described above. More specifically, FIG. 5A shows the ordinary recovery operation through the ink injection ports, and FIG. 5B shows a deposition recovery operation through the air-absorbing tubes 34 and 25 from the subtank 32.

In the ordinary recovery operation, the cap 14 is closed in step 100. The electromagnetic valve 26 is set in the subtank communication position and the air-absorbing tubes 34 and 25 are opened (a communication state) in step 101. In step 102, the absorbing pump 13 is activated to perform the recovery operation. When the ink is recovered, the communication valve 26 is set in the ventilation position (the air-absorbing tubes 34 and 25 are closed) in step 103. In step 104, the absorbing pump 13 is stopped. The cap 14 is then opened in step 105, and the recovery operation is completed. In step 106, a ready state for recording is set.

The solid lines in FIG. 6 indicate timings in the ordinary recovery operation as described above.

As shown in FIG. 6, the ventilation valve 27 is closed prior to activation of the pump 13 and is opened prior to deactivation of the pump 13.

In the deposition recovery operation in FIG. 5B, the cap 14 is closed in step 200. The electromagnetic valve 26 is set in the subtank communication position and the air-absorbing tubes 34 and 25 are kept open (i.e., a communication state) in step 201. The absorbing pump 13 is activated in step 202 and the recovery operation is performed. In this case, pumping is repeated in step 202, and the ink is filled from the subtank 32 to the cap 14 through the air-absorbing tubes 34 and 25.

When ink is sufficiently filled in the cap 14, the pump 13 is stopped in step 203. In step 204, the electromagnetic valve 26 is set in the ventilation position to disable communication of the air-absorbing tubes 34 and 25.

As shown in steps 205 and 206, the cap 14 is kept in the closed position while the ventilation valve 27 is kept closed.

In the above state, dissolving of the hardened ink in the ink injection ports by the ink in the cap 14 is delayed. When a duration of 1 to 10 minutes has elapsed and the ink is expected to be dissolved, the recovery operation (one ordinary recovery cycle) is performed through the ink injection ports, and the ready state for recording is set.

The alternate long and two short dashed lines in FIG. 6 represent differences between the ordinary recovery operation (solid lines) through the ink injection ports and the deposition recovery operation.

According to this embodiment as described above, there is provided a delivery device for an ink-jet recording apparatus, wherein the air-absorbing tube is disposed between the subtank and the cap to evacuate the subtank, the communication and ventilation valves are disposed midway along the air-absorbing tube, and the ink recovery operation can be properly performed even if ink clogging occurs in the ink injection ports.

(Second Embodiment)

Figure 7:
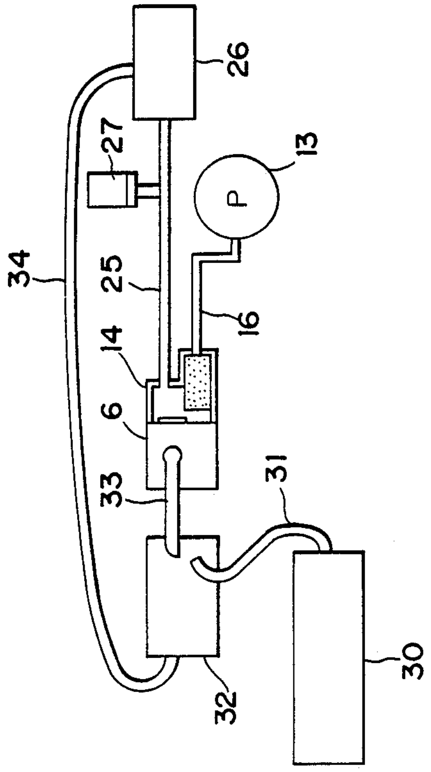
FIG. 7 is a schematic diagram showing a recovery device according to a second embodiment of the present invention.
Figure 8B:
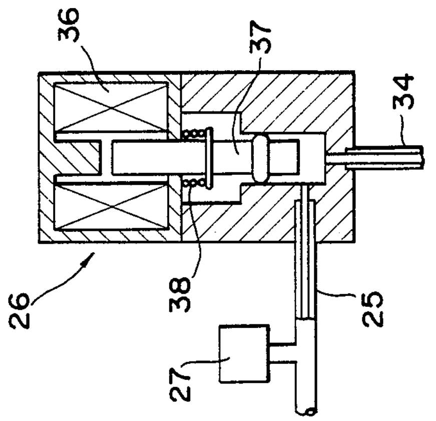
Figure 8A:
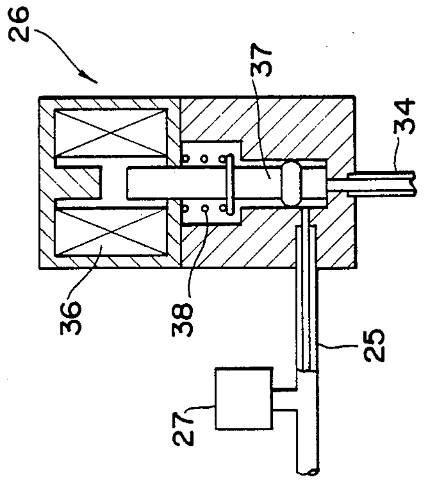

FIG. 7 is a schematic diagram for explaining a recovery operation of a recovery device according to a second embodiment. FIG. 8A shows a position where a communication valve 26 does not communicate with a subtank, and FIG. 8B shows a position where the communication valve 26 communicates with the subtank.

A ventilation valve 27 is connected between a cap 14 and the communication valve 26 and comprises a two-way valve which is set between a ventilation position where the valve 27 communicates with the atmospheric air and a closing position where the valve 27 does not communicate with the atmospheric air.

The communication valve 26 and the ventilation valve 27 are independently controlled.

According to the second embodiment, in the ordinary recovery operation for drawing ink through the ink injection ports, the communication valve (electromagnetic valve) 26 is moved to the closing position shown in FIG. 8A to move the ventilation valve 27 to the closing position. In this state, ink is drawn from the ink injection ports to an absorbing pump 13 through the cap 14 and the ink-absorbing tube 16.

In the deposition recovery operation for ink injection port clogging caused by strong ink deposition which disables ink absorption or does not allow smooth ink absorption, the communication valve 26 is operated to the position (FIG. 2B) where it communicates with the subtank 32, and the ventilation valve 27 is activated to the closing position. In this state, a negative suction force acts from the subtank 32 to the absorbing pump 13 through an air-absorbing tube 34, the communication valve 26, an air-absorbing tube 25, and the cap 14.

In this case, ink injection ports clog with a deposition ink, and the ink is supplied from the subtank 32 to the cap 14 through the absorbing tubes 34 and 25. The hardened ink can be dampened and dissolved by ink stored in the cap 14 and the deposition recovery effect can be enhanced. Therefore, ink can smoothly flow through the ink injection ports.

Figure 9B:
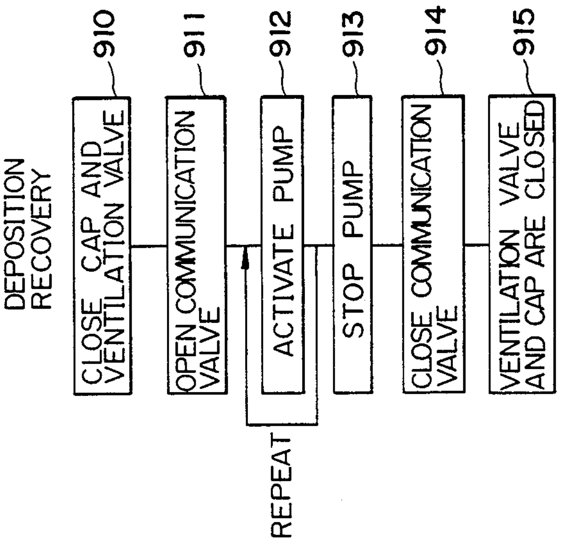
FIGS. 9A and 9B are flow charts for explaining recovery operations of the second embodiment.
Figure 9A:
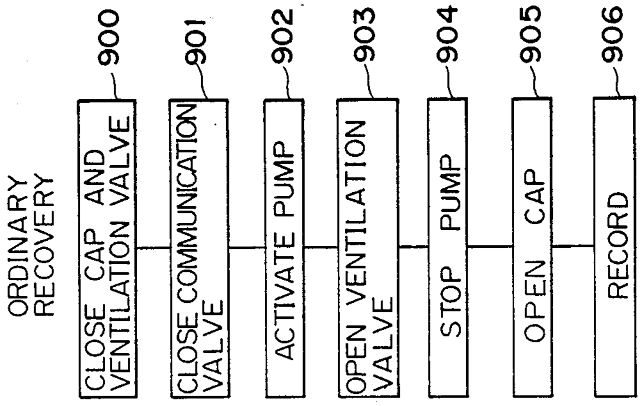

FIGS. 9A and 9B are flow charts for explaining the operation sequences of the recovery device described above. FIG. 9A shows the operation sequence for the ordinary recovery operation through the ink injection ports, and FIG. 9B shows the operation sequence for the deposition recovery operation performed by supplying ink from the subtank 32 to the cap 14.

In the ordinary recovery operation, the cap 14 is closed in step 900. The communication valve 26 is set in the closing position in step 901. In step 902, the absorbing pump 13 is activated while the ventilation valve 27 is kept closed. The ink is drawn through the ink injection ports, thus performing the ordinary recovery operation.

When the recording apparatus is recovered, the ventilation valve 27 is opened to supply ink from the cap to the pump in step 903. The pump 13 is stopped in step 904.

The cap 14 is opened in step 905 to complete the ordinary recovery operation. The ready state for recording is set in step 906.

In the deposition recovery operation in FIG. 9B, the cap 14 is closed in step 910, and the communication valve 26 is opened while the ventilation valve 27 is kept closed, thereby causing the cap 14 to communicate with the subtank 32. In step 912, the absorbing pump 13 is activated to supply ink from the subtank 32 to the cap 14.

In this case, the pump operation in step 912 is repeated to fill ink from the subtank 32 to the cap 14 through the absorbing tubes 34 and 25.

When ink is sufficiently filled, the pump 13 is stopped in step 913. The communication valve 26 is closed in step 914, and therefore the absorbing tubes 34 and 25 are closed.

The ventilation valve 27 is kept closed, and the cap 14 is held in a position wherein the ink injection ports are closed in step 915.

Figure 10A:
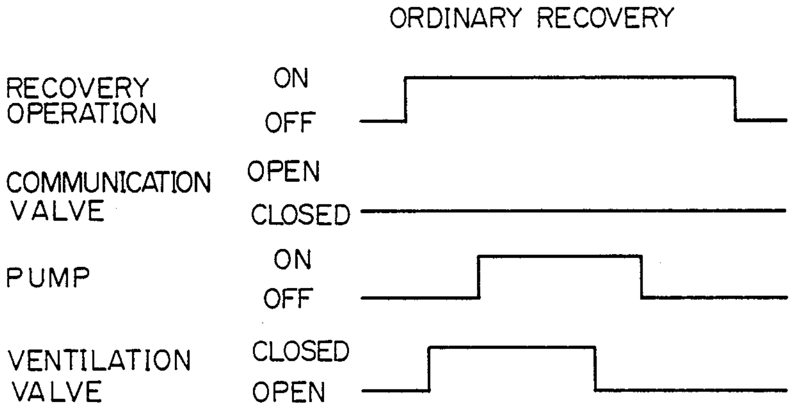
FIGS. 10A and 10B are timing charts for explaining the recovery operations of the second embodiments.
Figure 10B:
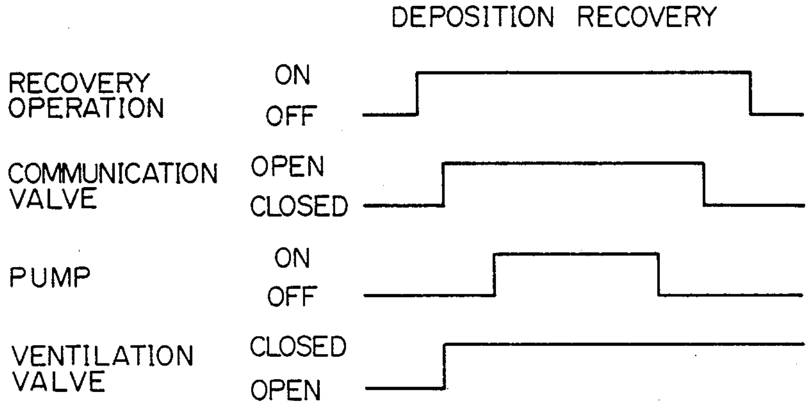

FIGS. 10A and 10B are timing charts of the recovery operations in the second embodiment. More specifically, FIG. 10A shows the ordinary recovery operation, and FIG. 10B shows the deposition recovery operation.

(Third Embodiment)

Figure 11:
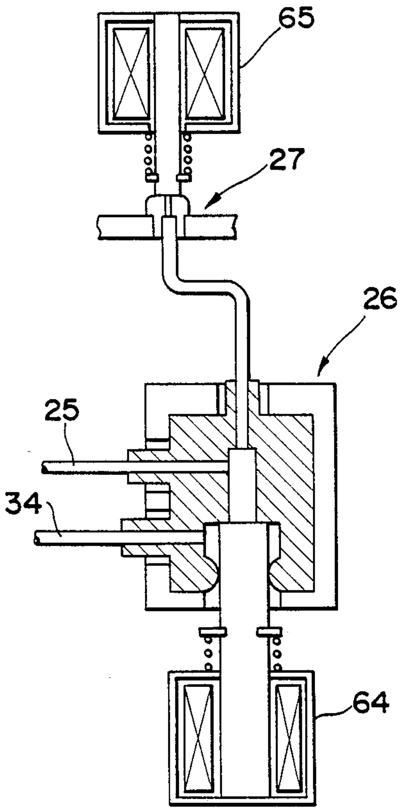
FIG. 11 is a schematic diagram of a drive mechanism for a recovery device according to a third embodiment of the present invention.

FIG. 11 shows a structure of a communication valve 26 and a ventilation valve 27 in a recovery device according to a third embodiment of the present invention.

Referring to FIG. 11, drive sources (solenoids) 64 and 65 are respectively connected to the communication valve 26 and the ventilation valve 27. The valves 26 and 27 are independently controlled.

In the deposition recovery operation, the solenoids 64 and 65 are selectively energized such that the communication valve 26 is open and the ventilation valve 27 is closed. The pump 13 is then driven to supply ink from a subtank 32 to a cap 14.

The pump 13 is stopped, and the communication valve 26 is closed. In this state, only the pump 13 is temporarily driven until the hardened ink is dissolved.

The pump 13 is then driven to open the ventilation valve 27. The ink is discharged from the cap 14, and the pump 13 is stopped to finish the deposition recovery operation.

In the third embodiment, ink is filled in the cap 14, and only the communication valve 26 can be closed at a predetermined timing and is kept closed until the hardened ink is dissolved. Therefore, an amount of ink used for dissolving can be limited.

It is possible to control the negative pressure by temporarily opening the ventilation valve 27 during the suction operation.

According to this embodiment as described above, the subtank 32 and the cap 14 are connected through the absorbing tubes 34 and 25. The communication and ventilation valves 26 and 27 which are independently controlled are arranged to set different specific modes of operations by changing a suction force and an ink flow so as to perform the ordinary recovery operation (e.g., meniscus recovery and removal of a foreign object) and the deposition recovery operation (e.g., removal of the hardened ink causing complete clogging of the injection ports). Therefore, an appropriate recovery operation corresponding to the state of the ink injection port can be selected to perform an effective recovery operation and minimize the wasteful use of ink.

Figure 12:
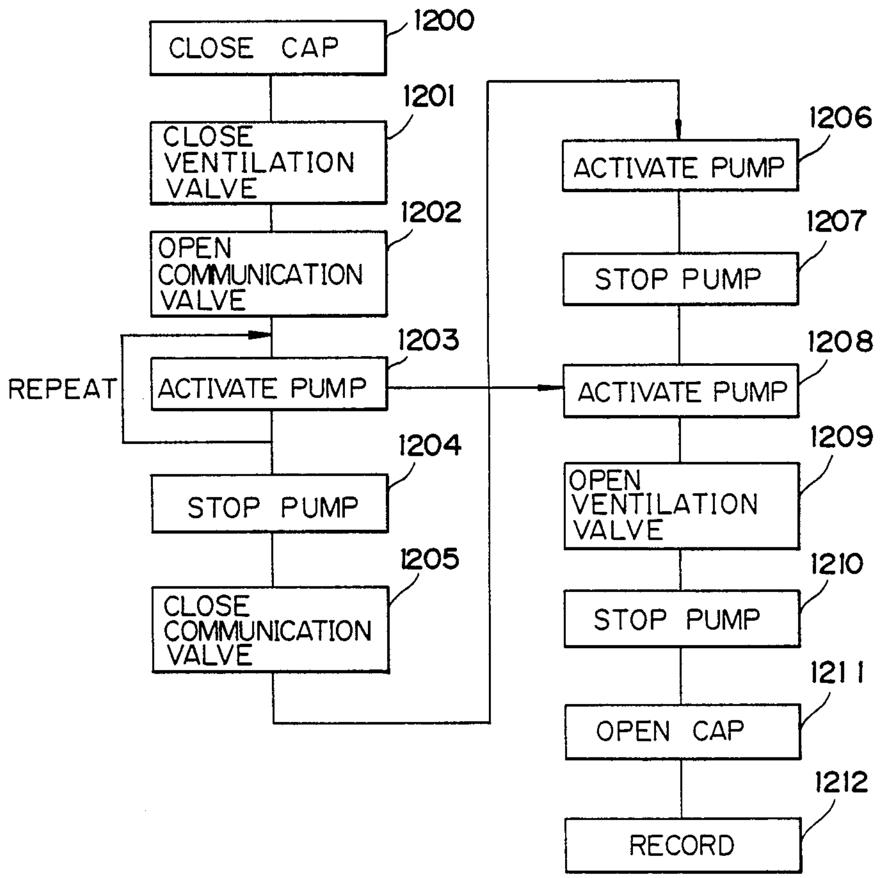
FIG. 12 is a flow chart for explaining a deposition recovery operation of the third embodiment.

FIG. 12 is a flow chart of a deposition recovery operation of the recovery device according to the third embodiment.

Referring to FIG. 12, when the recovery operation is started, the cap 14 closes the ink injection ports of the head 6 in step 1200. The ventilation valve 27 is closed in step 1201. The communication valve 26 is opened in step 1202. In this state, the absorbing pump 13 is activated a predetermined number of times in step 1203.

When ink from the subtank 32 is sufficiently filled in the cap 14 through the absorbing tubes 34 and 25, the flow advances to step 1204. In this step, the pump 13 is temporarily stopped. The communication valve 26 is kept in the closed position in step 1205.

The pump 13 is repeatedly activated and deactivated in steps 1206 to 1208 to remove the hardened ink from the ink injection ports.

When the ink injection ports recover their function, the ventilation valve 27 is opened in step 1209, and the pump 13 is stopped in step 1210. In step 1211, the cap 14 is removed from the head 6 to expose the ink injection ports to the atmosphere. Recording is started in step 1212.

Figure 13:
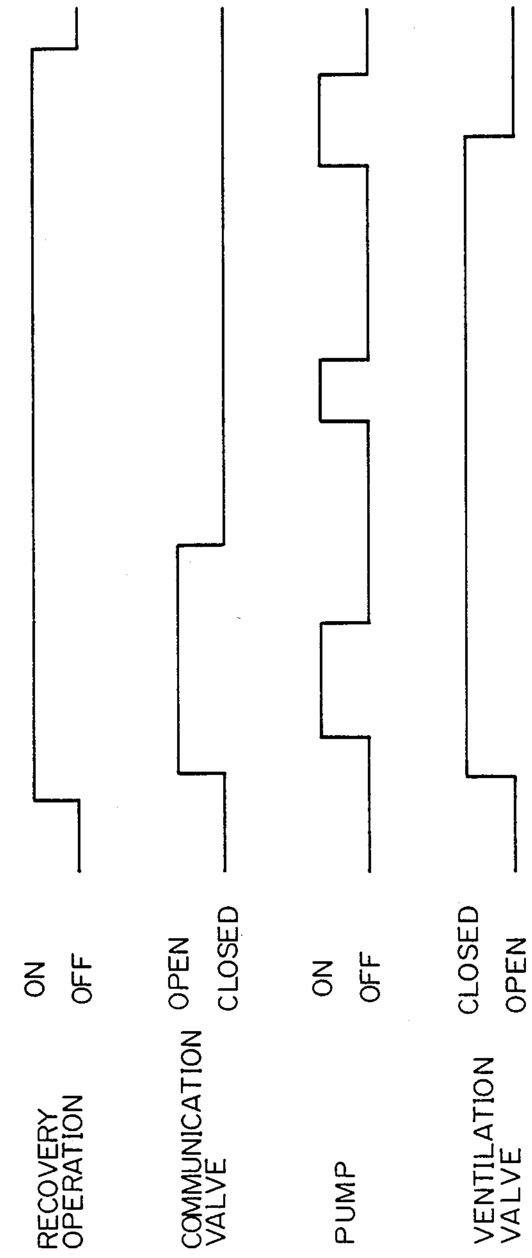
FIG. 13 is a timing chart for explaining the deposition recovery operation of the third embodiment.

FIG. 13 is a timing chart for explaining the operations of the communication valve 26, the pump 13, and the ventilation valve 27 in the recovery device of the third embodiment in the deposition recovery mode.

(Fourth Embodiment)

Figure 14:
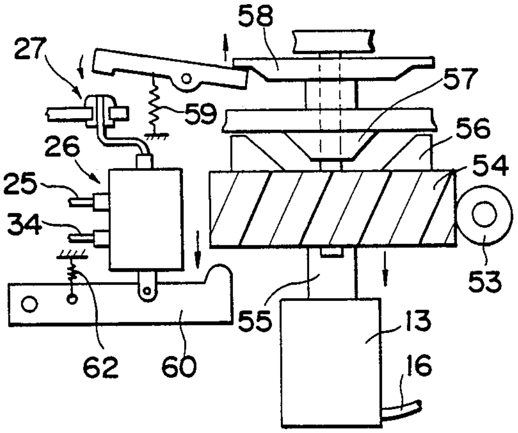
FIG. 14 is a schematic diagram of a drive mechanism for a recovery device according to a fourth embodiment of the present invention.

FIG. 14 shows a structure of a communication valve 26 and a ventilation valve 27 in a fourth embodiment.

Referring to FIG. 14, in the ordinary recovery operation, a recording head is closed by a cap 14 in a recording stop state. In this state, the ventilation valve 27 is open and the communication valve 26 is closed. A worm 53 is driven by a motor 12, and a worm wheel 54 is moved downward. A piston 55 is urged by the worm wheel 54 downward. A worm wheel cam 56 then cooperates with a stationary cam 57 to move a ventilation cam 58 upward. The worm wheel cam 56 and the stationary cam 57 constitute transmitting means. Therefore, the ventilation valve 27 is closed by a spring 59.

At the same time, a communication valve lever 60 is moved downward by the transmitting means, and then the ventilation valve 26 is kept open. Therefore, a subtank 32 communicates with the cap 14.

A suction operation for the recording head 6 is performed for several seconds through the cap 14 by a negative pressure generated by the pump 13. The ordinary recovery operation such as removal of a foreign material and meniscus recovery is performed.

When the worm wheel 54 is further rotated, the ventilation cam 58 is moved downward by the worm wheel cam 56 and the stationary cam 57, and the ventilation valve 27 is opened. When the worm wheel 54 continues to rotate, the worm wheel 54 is gradually moved upward, and the communication valve 26 is closed by a spring 62, thereby completing the ordinary recovery operation.

In the deposition recovery operation, rotation of the worm wheel 54 allows closing of the ventilation valve 27 and opening of the communication valve 26. In this state, the subtank 32 communicates with the cap 14.

When the pump 13 is activated to generate a negative pressure in the cap 14, the ink is supplied from the subtank 32 to the cap 14 through absorbing tubes 34 and 25 since the ink injection ports are clogged with the hardened ink.

The worm wheel 54 is repeatedly rotated in the forward and reverse directions while the valve 27 is kept closed. In other words, the pump 13 is repeatedly operated to increase negative pressure.

The recording head 6 is closed by the cap 14 and ink is filled in the cap 14. The ink full state is kept for about one minute.

When the worm wheel 54 is further rotated in the forward direction, the worm wheel cam 56 cooperates with the stationary cam 57 to move the ventilation cam 58 downward, thereby opening the ventilation valve 27. Therefore, the interior of the cap 14 communicates with the atmosphere, and ink filled in the cap is discharged through the ink-absorbing tube 16. Note that the ventilation valve is arranged above the communication valve to prevent ink leakage.

When the above rotation continues, the worm wheel 54 is moved upward to close the communication valve 26. Therefore, the deposition recovery operation is ended.

Since the ink full state of the cap 14 which receives the ink from the subtank 32 continues until the hardened ink is dissolved, ink injection port clogging caused by the hardened ink can be eliminated.

In addition, the suction operation is repeated while the cap 14 is filled with the ink, and therefore dissolving of hardened ink can be accelerated and clogging can be quickly eliminated.

(Fifth Embodiment)

The worm wheel and the stationary cam which constitute the transmitting means cooperating with the absorbing pump in the recovery device of the fourth embodiment are adjusted to close the communication valve 26 during the pump suction, thereby closing the absorbing tubes 34 and 25. In this state, the flow of ink from the subtank 32 to the cap 14 can be prevented, and excessive ink discharge can be prevented.

Since one motor is used as a driving source for opening/closing the communication and ventilation valves and the pump, a more compact design can be facilitated.

(Sixth Embodiment)

Figure 15:
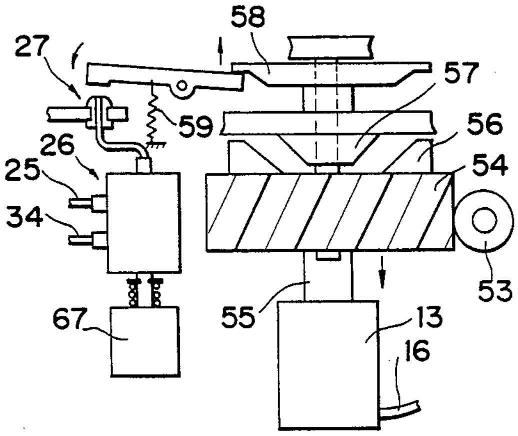
FIG. 15 is a schematic diagram of a drive mechanism for a recovery device according to a sixth embodiment of the present invention.

In the embodiment of FIG. 15, a ventilation valve 27 and a pump 13 are driven by a single driving source (i.e., a motor 12 for driving a worm 53), and a communication valve 26 is driven by a solenoid 67.

The structure of FIG. 15 is different from that of FIG. 14 except for the above point since the communication valve 26, the ventilation valve 27, and the pump 13 are driven by the single driving source in FIG. 14. Other arrangements of FIG. 15 are substantially the same as those of FIG. 14, and the same reference numerals as in FIG. 14 denote the same parts in FIG. 15.

The communication valve 26 and the ventilation valve 27 can be independently controlled in the embodiment of FIG. 15 in the same manner as in FIG. 14. The ordinary recovery operation, the deposition recovery operation, and various recovery operations as combinations of these recovery operations can be selectively performed with high efficiency.

(Seventh Embodiment)

Figure 16:
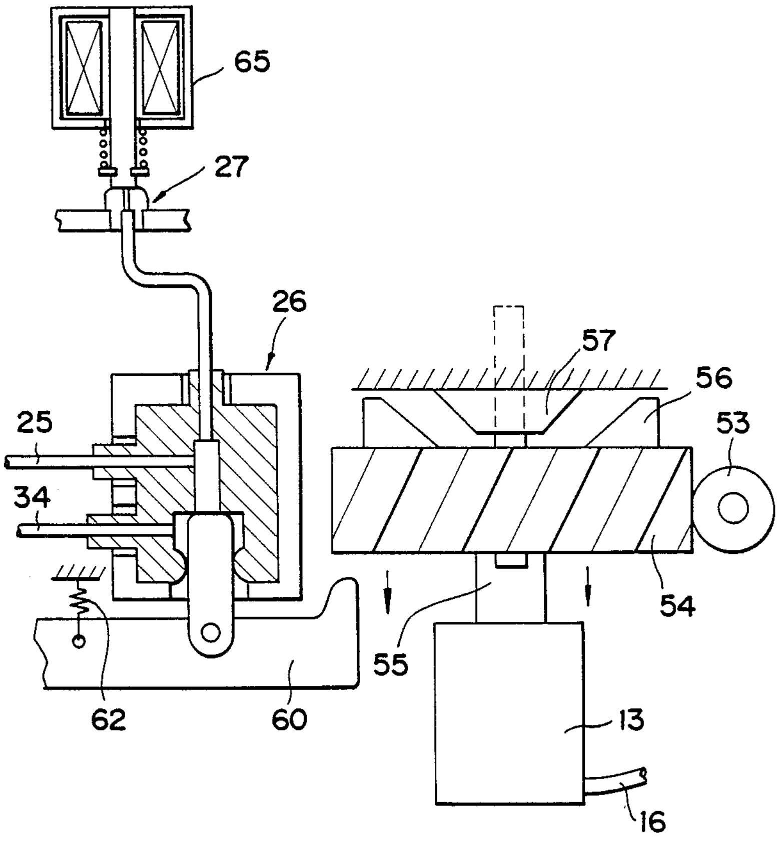
FIG. 16 is a schematic diagram of a drive mechanism for a recovery device according to a seventh embodiment of the present invention.

In the embodiment of FIG. 16, a pump 13 and a communication valve 26 are driven by a single driving source (i.e., a motor 12 for driving a worm 53), and a ventilation valve 27 is driven by a solenoid 65.

The structure of FIG. 16 is different from that of FIG. 14 except for the above point since the communication valve 26, the ventilation valve 27, and the pump 13 are driven by the single driving source in FIG. 14. Other arrangements of FIG. 16 are substantially the same as those of FIG. 14, and the same reference numerals as in FIG. 14 denote the same parts in FIG. 15.

The communication valve 26 and the ventilation valve 27 can be independently controlled in the embodiment of FIG. 16 in the same manner as in FIG. 14. The ordinary recovery operation, the deposition recovery operation, and various recovery operations as combinations of these recovery operations can be selectively performed in accordance with the degree of ink hardening with high efficiency.

Figure 17:
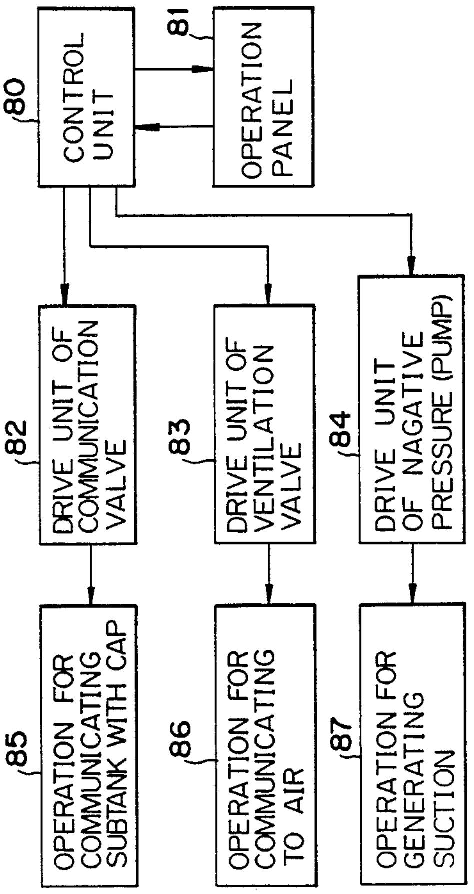
FIG. 17 is a block diagram of a control system in the recovery device according to the present invention.

FIG. 17 is a block diagram of a control system in the recovery device for the ink-jet recording apparatus according to the present invention.

Referring to FIG. 17, a control unit 80 receives an operation signal from an operation panel 81 and sends command signals to a drive unit 82 of the communication valve, a drive unit 83 of the ventilation valve, and a drive unit 84 of negative pressure (pump). These drive units (drivers) control an operation 85 for communicating the subtank 32 with the cap 14 (opening/closing of the absorbing tubes 34 and 25), an operation 86 for communicating to air (opening/closing of the communication valve 27), and an operation 87 for generating absorption of the pump 13.

The control unit 80 sends to the operation panel 81 signals for indicating the types of control and the presence/absence of operation errors.

According to the recovery device (FIG. 17) of the present invention, opening/closing of the communication valve 26, opening/closing of the ventilation valve 27, and the operation of the absorbing pump 13 can be independently controlled. An optimal recovery operation can be set in accordance with a clogging state and a degree of the ink injection ports. Effective ink recovery with low ink consumption can be quickly performed.

Figure 18:
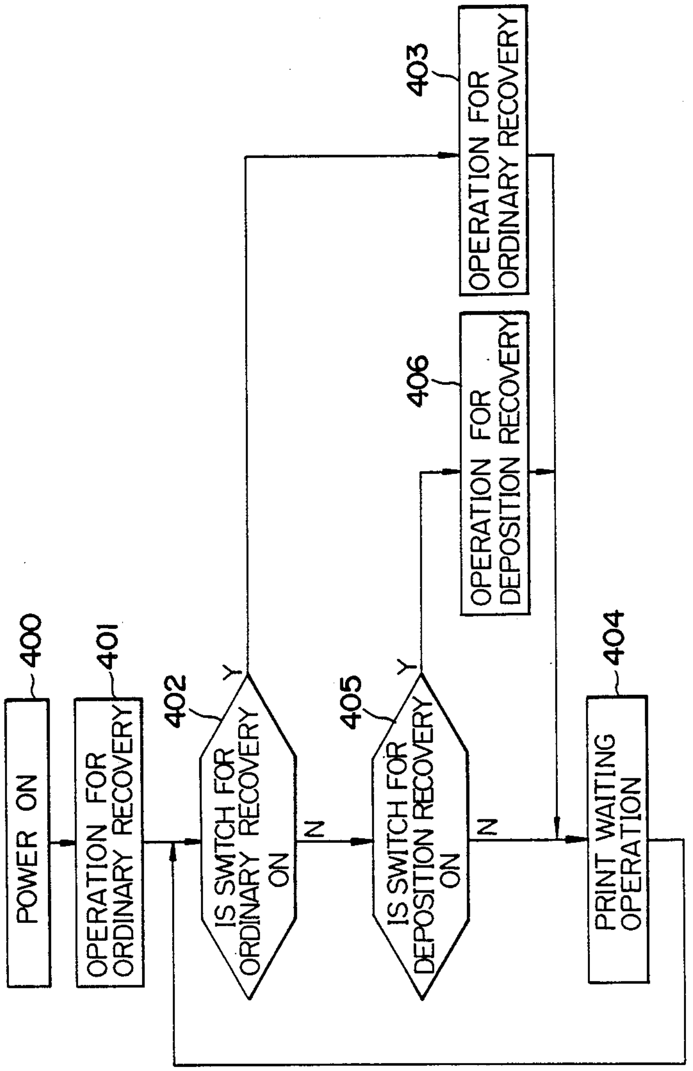
FIG. 18 is a flow chart for explaining a recovery operation according to the present invention.

FIG. 18 is a flow chart showing a control operation of the recovery device according to the present invention.

Referring to FIG. 18, a power switch is turned on in step 400. The initial ordinary recovery operation is performed once regardless of the degree of ink deposition in step 401. If an influence of clogging such as printing error is found, the ordinary or deposition recovery operation is performed in accordance with the state of the recording head 6.

When the initial ordinary recovery operation is performed, the control unit 80 determines in step 402 whether the ordinary recovery switch is ON. If YES in step 402, the ordinary recovery operation is performed in step 403. The flow then advances to step 404, and the print waiting operation is performed. The flow then returns to step 402.

If the ordinary recovery switch is determined to be OFF in step 402, the flow advances to step 405 to determine whether the deposition recovery switch is ON. If YES in step 405, the flow advances to step 406, and the deposition recovery operation is performed in this step. Thereafter, the flow advances to step 404, and the print waiting operation is performed. The flow then returns to step 402.

If the deposition recovery switch is determined to be OFF in step 405, the recovery operation is not performed, and the flow advances to step 404. The print waiting operation is performed, and the flow returns to step 402. The operations in the above steps are repeated.

In the recovery device for the ink-jet recording apparatus according to the present invention, as is apparent from the above description, the absorbing tube is connected between the subtank and the cap, and the communication valve for opening/closing the tube and the ventilation valve for causing the tube to communicate with the atmosphere are arranged midway along the absorbing tube. These valves are independently operated to selectively perform various recovery operations. The ordinary recovery operation, the deposition recovery operation, and various recovery operations as combinations of the above recovery operations can be selectively performed in accordance with the degree of ink deposition. Therefore, there is provided a recovery device which requires only low ink consumption and can perform effective recovery operations.

We claim:

1. A recovery device for an ink jet recording apparatus having a cap for covering an ink discharge port of a recording head and suction means communicating with the cap for sucking ink from the ink discharge port, said device comprising:

a tube having an interior communicating with the cap and a subtank for supplying ink to the recording head;

a communicating valve for connecting and disconnecting communication of the cap with the subtank provided in an intermediate portion of said tube; and a ventilating valve communicating the interior of said tube with the atmosphere provided separately from said communicating valve.

2. A recovery device according to claim 1, further including a solenoid for driving said communicating valve.

3. A recovery device according to claim 1, further including a solenoid for driving said ventilating valve.

4. A recovery device according to claim 2, further including a solenoid for driving said ventilating valve.

5. A recovery device according to claim 1, further including transmitting means cooperating with said suction means for driving said communicating valve.

6. A recovery device according to claim 1, further including transmitting means cooperating with said suction means for driving said ventilating valve.

7. A recovery device according to claim 2, further including transmitting means cooperating with said suction means for driving said ventilation valve.

8. A recovery device according to claim 5, further including transmitting means cooperating with said suction means for driving said ventilating valve.

9. A recovery device for an ink jet recording apparatus having a cap for covering an ink discharge port of a recording head and suction means communicating with the cap for sucking ink from the ink discharge port, said device comprising:

a tube having an interior communicating with the cap and a subtank for supplying ink to the recording head;

a communicating valve for connecting and disconnecting communication of the cap with the subtank provided in an intermediate portion of said tube;

a ventilating valve communicating the interior of said tube with the atmosphere provided separately from said communicating valve; and wherein said recovery device performs a first recovery operation in which said ventilating valve is closed and the ink is sucked from said ink discharge port and a second recovery operation in which said ventilation valve is opened and the ink is sucked from said subtank and introduced to said cap.

10. A recovery device according to claim 9, wherein the second recovery operation is continuously performed more than a minute during which ink is introduced into the cap.

11. A recovery device according to claim 10, wherein the second recovery operation includes a further suction operation during which ink is introduced into the cap.

12. A recovery device according to claim 1, wherein said cap further including an ink absorber therein.

13. A recovery device according to claim 1, further including an opening for communicating said ventilating valve with the atmosphere provided at a highest position in an ink path.

14. An ink jet recording apparatus comprising:

a recording head having an ink discharge port for discharging ink;

a main tank for containing the ink;

a cap for covering the ink discharge port; and a recovery device having;

(i) a subtank for accumulating ink supplied from said main tank and supplying ink to said recording head;

(ii) a tube having an interior communicating with said cap and said subtank;

(iii) a communicating valve for connecting and disconnecting communication of said cap with said subtank provided in an intermediate portion of said tube;

(iv) a ventilating valve for communicating the interior of said tube with the atmosphere provided separately from said communicating valve; and (v) suction means communicating with said cap for generating negative pressure in said cap.

15. An ink jet recording apparatus according to claim 14, wherein said recording head discharges liquid droplets by heat.

16. An ink jet recording apparatus comprising:

(a) recording means having a discharge port for discharging ink therethrough;

(b) storing means for storing ink to be supplied through a supply path to said recording means;

(c) capping means for covering the discharge port;

(d) suction means in communication with said capping means at a first location; and (e) a communication path having, first and second ends, the first end being connected to said capping means at a second location, the second location being different from the first location and the second end being connected to said storing means, first valve means for connecting and disconnecting communication through said communication path, and second valve means for connecting and disconnecting communication between said communication path and the atmosphere, wherein said first valve means is provided separately from said second valve means.

17. An ink jet recording apparatus according to claim 16, further including a solenoid for driving said first valve means.

18. An ink jet recording apparatus according to claim 16, further including a solenoid for driving said second valve means.

19. An ink jet recording apparatus according to claim 17, further including a solenoid for driving said second valve means.

20. An ink jet recording apparatus according to claim 16, further including transmitting means cooperating with said suction means for driving said first valve means.

21. An ink jet recording apparatus according to claim 16, further including transmitting means cooperating with said suction means for driving said second valve means.

22. An ink jet recording apparatus according to claim 20, further including transmitting means cooperating with said suction means for driving said second valve means.

23. An ink jet recording apparatus according to claim 16, wherein said recovery apparatus performs a first recovery operation in which said second valve means is closed and ink is sucked from the discharge port and a second recovery operation in which said first valve means is opened and ink is sucked from said storing means and introduced to said capping means.

24. An ink jet recording apparatus according to claim 23, wherein the second recovery operation is continuously performed more than a minute during which ink is introduced into said capping means.

25. An ink jet recording apparatus according to claim 24, wherein the second recovery operation includes a further suction operation during which ink is introduced into said capping means.

26. An ink jet recording apparatus according to claim 16, wherein said capping means further includes an ink absorber therein.

27. An ink jet recording apparatus according to claim 16, further including an opening for communicating said second valve means with the atmosphere provided at a highest position in an ink path.

28. An ink jet recording apparatus according to claim 16, wherein said recording means discharges ink by heat.

29. An ink jet recording apparatus according to claim 16, wherein said storing means further includes a first ink tank for storing ink therein and a second ink tank containing ink supplied from said first ink tank.

30. An ink jet recording apparatus according to claim 16, wherein said suction means comprises a pump driven by a motor.

31. An ink jet recording apparatus according to claim 16, further including control means for controlling said suction means, said first valve means and said second valve means.

32. An ink jet recording apparatus according to claim 31, further including a cam for driving said first valve means and said second valve means and said control means comprises a mechanism for controlling said cam.

33. An ink jet recording apparatus comprising:

(a) a recording head having a discharge orifice for discharging ink therethrough;

(b) an ink tank for storing ink to be supplied through a supply path to said recording head;

(c) a cap for covering the discharge orifice;

(d) a suction pump in communication with said cap at a first location; and (e) a communication tube having, first and second ends, said first end being connected to said cap at a second location, the second location being different from the first location and the second end being connected to said ink tank, a communication valve for connecting and disconnecting communication through said communication tube, and a ventilation valve for connecting and disconnecting communication between said communication tube and the atmosphere, wherein said communication valve is provided separately from said ventilation valve.

34. An ink jet recording apparatus according to claim 33, further including a solenoid for driving said communication valve.

35. An ink jet recording apparatus according to claim 33, further including a solenoid for driving said ventilation valve.

36. An ink jet recording apparatus according to claim 34, further including a solenoid for driving said ventilation valve.

37. An ink jet recording apparatus according to claim 33, further including transmitting means cooperating with said suction pump for driving said communication valve.

38. An ink jet recording apparatus according to claim 33, further including transmitting means cooperating with said suction pump for driving said ventilation valve.

39. An ink jet recording apparatus according to claim 37, further including transmitting means cooperating with said suction pump for driving said ventilation valve.

40. An ink jet recording apparatus according to claim 33, wherein said recovery apparatus performs a first recovery operation in which said ventilation valve is closed and ink is sucked from the discharge orifice and a second recovery operation in which said communication valve is opened and ink is sucked from said ink tank and introduced into said cap.

41. An ink jet recording apparatus according to claim 40, wherein the second recovery operation is continuously performed more than a minute during which ink is introduced into said cap.

42. An ink jet recording apparatus according to claim 41, wherein the second recovery operation includes a further suction operation during which ink is introduced into said cap.

43. An ink jet recording apparatus according to claim 33, wherein said cap further includes an ink absorber therein.

44. An ink jet recording apparatus according to claim 33, further including an opening for communicating said ventilation valve the atmosphere provided at a highest position in an ink path.

45. An ink jet recording apparatus according to claim 33, wherein said recording head discharges ink by heat.

46. An ink jet recording apparatus according to claim 33, wherein said ink tank comprises a first ink tank for storing ink therein and further comprises a second ink tank containing ink supplied from the first ink tank.

47. An ink jet recording apparatus according to claim 33, wherein said suction pump is driven by a motor.

48. An ink jet recording apparatus according to claim 33, further comprising control means for controlling said suction pump, said communication valve and said ventilation valve.

49. An ink jet recording apparatus according to claim 48, further including a cam for driving said communication valve and said ventilation valve and said control means comprises a mechanism for controlling said cam.

* * * * *

UNITED STATES PATENT AND TRADEMARK OFFICE
CERTIFICATE OF CORRECTION

PATENT NO. : 4,893,138

DATED : January 9, 1990

INVENTOR(S) : KOJI TERASAWA, ET AL.

It is certified that error appears in the above-identified patent and that said Letters Patent is hereby corrected as shown below:

ON THE TITLE PAGE,

IN [56] REFERENCES CITED

FOREIGN PATENT DOCUMENTS, "1134464 9/1981 Japan." should read --113464 9/1981 Japan.--.

IN [57] ABSTRACT

Line 2, "cup" should read --cap--.

SHEET 13 OF 14

Fig. 17, "NAGATIVE" should read --NEGATIVE--.

COLUMN 1

Line 60, "abosrbing" should read --absorbing--.

COLUMN 2

Line 25, "abosrbing" should read --absorbing--.

COLUMN 3

Line 10, "embodiments;" should read --embodiment;--.
Line 54, "allow." should read --arrow.--.

COLUMN 4

Line 27, "open," should read --open),--.

COLUMN 7

Line 15, "(FIG. 2B)" should read --(FIG. 8B)--.

UNITED STATES PATENT AND TRADEMARK OFFICE

CERTIFICATE OF CORRECTION

PATENT NO. : 4,893,138

DATED : January 9, 1990

INVENTOR(S) : KOJI TERASAWA, ET AL.

It is certified that error appears in the above-identified patent and that said Letters Patent is hereby corrected as shown below:

COLUMN 11

Line 24, "once" should read --once,--.

COLUMN 12

Line 61, "including" should read --includes--.

COLUMN 13

Line 3, "having;" should read --having:--.

COLUMN 16

Line 8, "valve the" should read --valve with the--.

Signed and Sealed this

Sixteenth Day of April, 1991

*Attest:*

HARRY F. MANBECK, JR.

*Attesting Officer*

*Commissioner of Patents and Trademarks*